US007324686B2

(12) United States Patent
Nister

(10) Patent No.: US 7,324,686 B2
(45) Date of Patent: Jan. 29, 2008

(54) SCENE RECONSTRUCTION AND CAMERA CALIBRATION WITH ROBUST USE OF CHEIRALITY

(75) Inventor: David Nister, Plainsboro, NJ (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1027 days.

(21) Appl. No.: 10/380,838

(22) PCT Filed: Sep. 26, 2001

(86) PCT No.: PCT/SE01/02063

§ 371 (c)(1),
(2), (4) Date: Mar. 19, 2003

(87) PCT Pub. No.: WO02/41252

PCT Pub. Date: May 23, 2002

(65) Prior Publication Data

US 2004/0096097 A1 May 20, 2004

(30) Foreign Application Priority Data

Nov. 16, 2000 (SE) .................................. 0004210

(51) Int. Cl.
*G06K 9/00* (2006.01)
*G06T 15/00* (2006.01)
(52) U.S. Cl. ...................... 382/154; 345/419
(58) Field of Classification Search .............. None
See application file for complete search history.

(56) References Cited

U.S. PATENT DOCUMENTS

| 5,598,515 A | | 1/1997 | Shashua |
|---|---|---|---|
| 5,821,943 A | * | 10/1998 | Shashua ................ 345/427 |
| 6,243,599 B1 | * | 6/2001 | Van Horn ............... 600/407 |
| 6,289,235 B1 | * | 9/2001 | Webber et al. .......... 600/426 |

FOREIGN PATENT DOCUMENTS

| EP | 0 895 192 | 7/1997 |
|---|---|---|
| EP | 0 895 192 | 2/1999 |

OTHER PUBLICATIONS

"Camera Calibration and the Search for Infinity", Richard I. Hartley et al., Proc. Of the seventh IEEE International Conference on Computer Vision, vol. 1, pp. 510-517, Sep. 20-27, 1999.*

(Continued)

*Primary Examiner*—Wenpeng Chen
(74) *Attorney, Agent, or Firm*—Nixon & Vanderhye P.C.

(57) ABSTRACT

The technology described relates to reconstruction of 3-dimensional scenes from uncalibrated images, and provides a robust and systematic strategy for using cheirality in scene reconstruction and camera calibration. A general projective reconstruction is upgraded to a quasi-affine reconstruction. Cheirality constraints are deduced with regard to the cameras by statistical use of scene points in a voting procedure. The deduced cheirality constraints constrain the position of the plane at infinity. Linear programming is used to determine a tentative plane at infinity. Based on this tentative plane at infinity, the initial projective reconstruction can be transformed into a reconstruction that is quasi-affine with respect to the cameras.

39 Claims, 10 Drawing Sheets

OTHER PUBLICATIONS

"Projective Reconstruction and Invariants from Multiple Images," Richard I. Hartley, IEEE Transactions on Pattern Analysis and Machine Integence, vol. 16, No. 10, pp. 1036-1041, Oct. 1994.*

"Projective reconstruction from line correspondence," Richard I. Hartley, Proceedings 1994 IEEE Computer Sociaty Conference on Computer Vision and Pattern Recognition, pp. 903-907, Jun. 21-23, 1994.*

Maybank Abstract, Maybank et al.

Fusiello, *Uncalibrated Euclidean Reconstruction: A Review*, Image and Vision Computing, Dip. D Matematica e Informatica, Università di Udine, Udine, Italy pp. 1-27.

Hartley et al., *Camera calibration and the search for infinity*, Proc. 7th International Conference on Computer Vision, vol. 1, pp. 510-517, 1999.

Hartley, *Cheirality*, International Journal of Computer Vision, 26(1):41-61, 1998.

Hartley, *Euclidean Reconstruction from Uncalibrated Views*, Lecture Notes in Computer Science, vol. 825, pp. 237-256, Springer Verlag, 1994.

Heyden et al., *Flexible Calibration : Minimal Cases for Auto-calibration*, Proc. 7th International Conference on Computer Vision, vol. 1, pp. 350-355, 1999.

Mohr et al., *Projective Geometry for Image Analysis*, A Tutorial given at ISPRS, Vienna, Jul. 1996, pp. 1-42.

Nistér, *Reconstruction from Uncalibrated Sequences with a Hierarchy of Trifocal Tensors*, Visual Technology, Ericsson Research, Ericsson Radio Systems, Stockholm, Sweden, 15 pages.

Chapter 10. *Minimization or Maximization of Functions*, Sample page from Numerical Recipes in C: The Art of Scientific Computing, © 1988-1992 by Cambridge University Press, pp. 430-444.

15.5 *Nonlinear Models*, Sample page from Numerical Recipes in C: The Art of Scientific Computing, © 1988-1992 by Cambridge University Press, pp. 681-689.

Pollefeys, et al., *Self-Calibration and Metric Reconstruction in spite of Varying and Unknown Intrinsic Camera Parameters*, International Journal of Computer Vision, 1998, pp. 1-18.

Triggs et al., *Bundle Adjustment—A Modern Synthesis*, pp. 1-70.

* cited by examiner

SCENE RECONSTRUCTION AND CAMERA CALIBRATION WITH ROBUST USE OF CHEIRALITY

This application is the US national phase of international application PCT/SE01/02063 filed 26 Sep. 2001, which designated the US.

TECHNICAL FIELD OF THE INVENTION

The present invention generally relates to computer vision and image processing, and more particularly to the reconstruction of 3-dimensional scenes from a number of uncalibrated images.

BACKGROUND OF THE INVENTION

Reconstruction of 3-D objects or scenes from a sequence of uncalibrated images is currently a hot topic in the field of image processing and computer vision. Scene reconstruction techniques has gained much interest recently partly because of a rapidly increasing number of scene reconstruction applications together with the wide-spread use of digital cameras, film scanners, photographic scanners and other digitizing equipment. Examples of scene reconstruction applications include reconstruction of 3-D scenes and objects, scene determination and object localization for robot navigation, automatic construction of 3-D CAD models as well as creation of virtual reality environments, even generation of real-time 3-D views of dynamic scenes. For instance, a person could walk around his or her house with a camera, taking images from different views, and feed the images into a computerized 3-D scene builder to obtain a virtual 3-D visualization of the house.

The basic reconstruction problem can be formulated in the following way. Based on a sequence of uncalibrated images of a 3-dimensional scene or object taken by one or more cameras from different views, it is desired to recover the general 3-dimensional structure of the scene, as well as the position and orientation of the camera for each camera view. For simplicity, each unique position and orientation of the camera is often referred to as a "camera" in the scientific literature, although all the images may have been taken by a single camera, or even generated artificially by a computer. In the case of artificially generated computer images, each image view is associated with an "imaginary" camera, having a unique position and orientation.

In a typical approach for solving the reconstruction problem, a so-called projective reconstruction is first established based on image correspondences between the uncalibrated images and then the projective reconstruction is successively refined into a "normal" Euclidean reconstruction. When starting from a sequence of uncalibrated images, the best initial reconstruction that can be obtained based on image correspondences, i.e. identification of matching feature points in the images, is generally a projective reconstruction. A projective reconstruction is a configuration of scene points and cameras that is a projective transformation away from the true Euclidean configuration that was imaged. In similarity to Euclidean and so-called affine transformations, the unknown projective transformation is capable of translating, rotating and skewing the configuration of scene points and cameras. However, a projective transformation can also move the plane at infinity, which means that parallelism is generally not preserved. In order to be able to view a reconstruction of the scene in Euclidean space, the unknown projective transformation has to be determined. In practice, the determination of the unknown projective transformation has turned out to be a very difficult and complex task.

In the prior art, attempts have been made to determine the projective transformation by enforcing constraints on the camera views requiring that the cameras all have the same intrinsic calibration. Although a general projective transformation does not change the reprojected images, it can distort them very much to something that is not expected. The constraints imposed on the calibration facilitate the search for a member of the family of possible reconstructions that is likely. The process of finding such a likely reconstruction using constraints imposed on the calibration is generally referred to as auto-calibration or self-calibration, and is described for example in [1]. In an extension of the basic theory of auto-calibration it has been observed, for example in [2] and [3], that auto-calibration is possible under much looser assumptions, namely under the minimal assumption that the cameras have no skew, or that the pixels have a fixed or known aspect ratio. This opens up for auto-calibration on video sequences with a zooming camera.

Although the above auto-calibration procedures generate quite satisfactory results in some cases, they often produce rather poor results and sometimes even lead to complete failures.

It is has been observed that one of the main difficulties in auto-calibration is to find the true plane at infinity in the projective reconstruction, and therefore it has been proposed in references [4], [5] and [6] to impose additional constraints on the reconstruction by considering so-called cheirality. As defined in [5], object space is the 3-dimensional Euclidean space $R^3$. Similarly. image space is the 2-dimensional Euclidean space $R^2$. Euclidean space $R^3$ is embedded in a natural way in projective 3-space $P^3$ by the addition of a plane at infinity. Similarly. $R^2$ may be embedded in the projective 2-space $P^2$ by the addition of a line at infinity. The $(n-1)$-dimensional subspace at infinity in projective space $P^n$ is referred to as the plane at infinity, except where we are specifically considering $P^2$. The true plane at infinity $p_\infty$ (in other words the plane to be mapped to infinity in Euclidean space) has a well-defined but initially unknown position in the projective reconstruczion. As defined in reference [5], which provides a basic presentation of the concept and theory of cheirality, the property of a point that indicates whether it lies in front of or behind a given camera is generally referred to as the cheirality of the point with respect to the camera. The additional cheirality constraints imposed on the projective reconstruction require that all the reconstructed scene points must lie in front of the cameras that imaged them. This is not true for an arbitrary projective reconstruction. By using the cheirality constraints, expressed in terms of so-called cheiral inequalities, for all points in the projective reconstruction, the search for the true plane at infinity can be narrowed down considerably. This is generally accomplished by making a preliminary transformation of the initial projective reconstruction to a so-called quasi-affine reconstruction of the scene points and cameras based on the given cheiral inequalities. A quasi-affine reconstruction of a scene is a projective reconstruction in which the reconstructed scene is not split by the plane at infinity.

Although the introduction of cheirality-based scene reconstruction methods constitutes a great advance in the field of auto-calibration, there are still remaining problems with regard to convergence and stability.

SUMMARY OF THE INVENTION

The present invention overcomes these and other drawbacks of the prior art arrangements.

It is a general object of the present invention to provide fast and accurate reconstruction of a 3-dimensional Euclidean scene from a sequence of uncalibrated digital or digitized images.

It is also an object of the invention to provide a method and system for upgrading a general projective reconstruction into a quasi-affine reconstruction, which subsequently may be refined into a Euclidean reconstruction. In particular, it is important to find a robust, reliable and at the same time relatively fast way of accomplishing this upgrading of the general projective reconstruction.

Yet another object of the invention is to provide a computer program configured with program elements for upgrading a general projective reconstruction into a quasi-affine reconstruction in a robust and systematic manner.

These and other objects are met by the invention as defined by the accompanying patent claims.

The invention is based on the recognition that conventional cheirality-based methods for upgrading general projective reconstructions into quasi-affine reconstructions are very sensitive to bad points. Even if outliers are weeded out by carefully considering the geometry, there is bound to be one or two bad points in a set of ten thousand scene points due to uncertainty or unfortunately positioned outliers. Such bad or incorrect points may render the cheiral inequalities as a whole unsolvable, returning the null vector for the plane at infinity or simply returning an incorrect solution.

Briefly, the present invention provides a robust and systematic strategy for using cheirality in scene reconstruction and camera calibration that is much more reliable than conventional methods. The general idea according to the invention is to transform the initial projective scene reconstruction into a scene reconstruction that is explicitly enforced to be quasi-affine only with respect to the camera projection centers and possibly a fractional subset of the scene points of the initial projective reconstruction.

In this regard, it is not assumed that it is always possible to derive a set of cheiral inequalities that are solvable as a whole, but rather it is assumed that it is possible to find correct inequalities related to the camera projection centers, here simply called cameras, by intelligent use of the scene points. The key feature to accomplish this is to deduce cheiral inequalities that are correct for the cameras by statistical use of the scene points in a voting procedure that considers the cheirality of a plurality of scene points with respect to the cameras. The deduced cheiral inequalities act as constraints on the position of the plane at infinity, and solving the cheiral inequalities for the cameras generally gives a reconstruction that is quasi-affine with respect to the camera projection centers, also referred to as a QUARC reconstruction. This means that the trajectory of camera projection centers is not split by the plane at infinity, and this, as it turns out, is a very powerful condition for successful auto-calibration.

The upgrading to a Euclidean reconstruction then typically proceeds with an iterative optimization procedure starting from the obtained QUARC reconstruction. It turns out that starting the iterative optimization from a QUARC reconstruction is a necessary condition for most auto-calibration algorithms to converge. In practice, this is most often also a sufficient condition, provided that the optimized objective function is representative of a physically meaningful quantity.

The method according to the invention has been found to be extremely reliable for both large and small reconstructions. Even when subjected to the common degeneracy of little or no rotation between views, the inventive method still yields a very reasonable member of the family of possible solutions. Furthermore, the method according to the invention is fast and therefore suitable for the purpose of viewing reconstructions.

In a systematic approach for deducing the cheiral inequalities for the cameras, the camera projection centers are first divided into unique subsets. For each subset, a constraint on the position of the plane at infinity is then established by performing statistical majority voting based on the cheirality of a plurality of scene points with respect to at least two of the camera projection centers within the subset. Preferably, the camera projection centers are divided into pairs, and the constraints are deduced with respect to each pair $c(n)$, $c(n+1)$ of camera centers, where $n=1$ to $N-1$ and N equals the total number of camera projection centers.

As a complement to deducing cheiral inequalities for the cameras only, it is possible to narrow the search for the true plane at infinity even further. This is accomplished by considering different hypotheses for the plane at infinity and accepting hypotheses based on cheirality for the scene points, but without requiring correct cheirality for all scene points. In practice, this means accepting those hypotheses for which the number of satisfied cheiral inequalities exceeds a given threshold level.

The invention offers the following advantages:

Fast and accurate scene reconstruction;

Robust use of cheirality, thus providing stable convergence during auto-calibration; and Relatively low computational complexity.

Other advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS OF THE INVENTION

Figure 1:
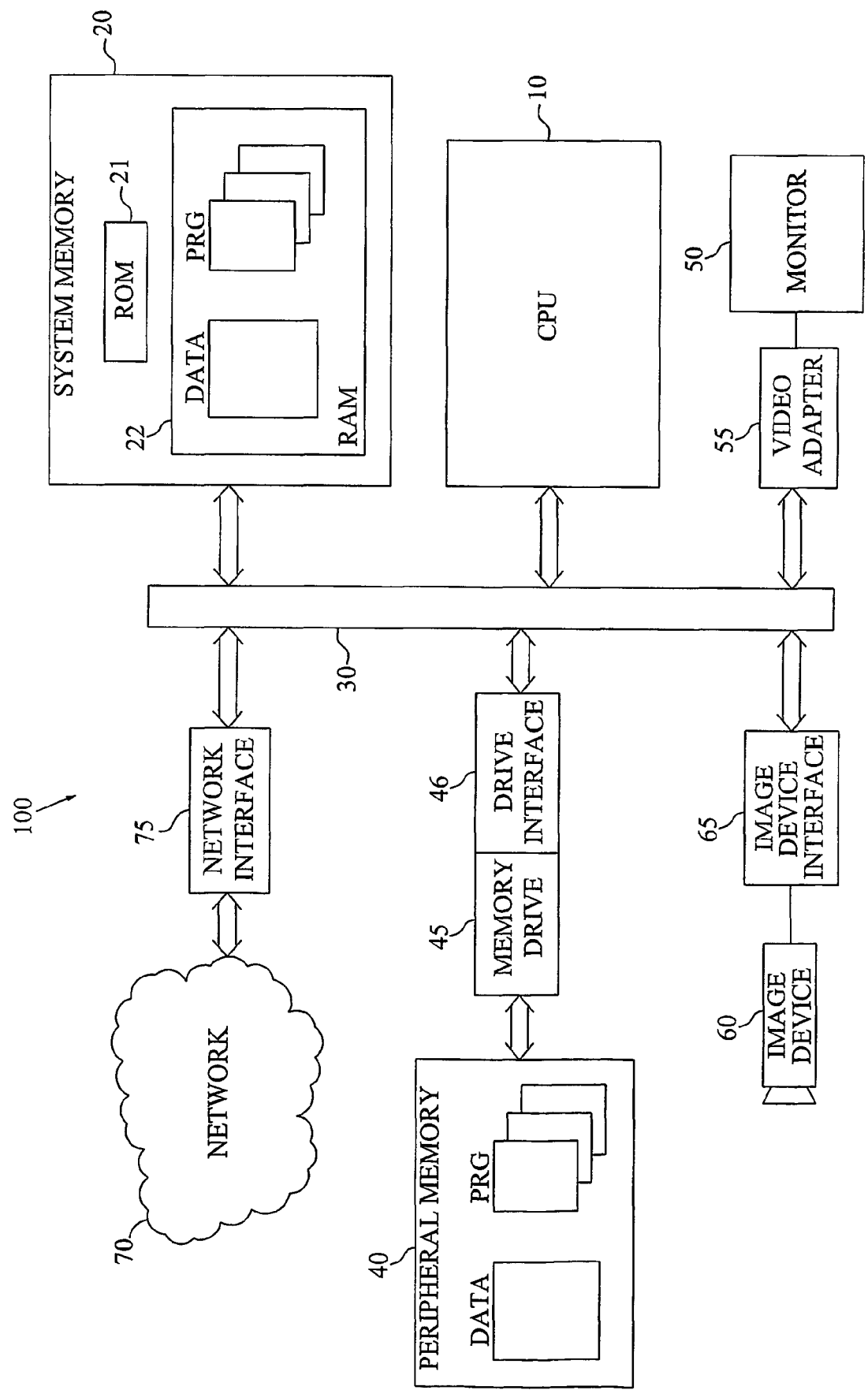
FIG. 1 is a schematic block diagram illustrating an example of a computer system suitable for implementation of the invention.

Throughout the drawings, the same reference characters will be used for corresponding or similar elements.

For a better understanding of the invention, it is useful to begin by a general presentation of a suitable computer system in which the invention may be implemented.

System Overview

FIG. 1 is a schematic block diagram illustrating an example of a computer system suitable for implementation of the invention. The computer system may be realized in the form of any conventional computer system, including personal computers, mainframe computers, multiprocessor systems, microprocessor-based consumer electronics, network PCs, hand-held devices and the like. Anyway, the computer system 100 basically comprises a central processing unit (CPU) 10, a system memory 20 and a system bus 30 that interconnects the various system components. The system memory 20 typically includes a read only memory (ROM) 21 with a basic input/output system (BIOS) and similar routines and a random access memory (RAM) 22.

Furthermore, the computer system normally comprises one or more peripheral memory devices 40, such as hard disks, magnetic disks, optical disks, floppy disks or digital video disks, providing non-volatile storage of data and program information. Each peripheral memory 40 is normally associated with a memory drive 45 as well as a drive interface 46 for connecting the memory device 40 to the system bus 30. A number of program modules, typically including an operating system, one or more application programs and other program modules, may be stored in the peripheral memory 40 and loaded into the RAM 22 of the system memory 20 for subsequent execution by the CPU 10. The computer system typically has a user interface (not shown) such as a keyboard, a pointing device or a voice recognition system. The computer system also comprises a monitor 50 that is connected to the system bus 30 via a suitable interface such as a video adapter 55. Of particular significance to the present invention, an image device 60 capable of providing a sequence of images is connected to the computer system. Examples of suitable image devices include digital video cameras, film or photographic scanners or other digitizing equipment, as well as frame grabbers. The image device 60 is connected to the system bus 30 via a suitable interface 65, thereby allowing image data to be transferred to and stored in the peripheral memory device 40 and/or the system memory 20 for processing by the CPU 10 under the control of one or more active program modules. However, it should be understood that image data can be provided to the computer system from any of the aforementioned peripheral memory devices without requiring a camera or digitizer directly connected to the system. Image data can even be downloaded from a remote computer over a local area network, the Internet or any other type of network 70 via a conventional network interface 75. It should also be understood that the images do not necessarily have to be real-world camera images, but may be provided in the form of artificially generated computer images.

As indicated above, the invention is preferably implemented as software in the form of program modules, functions or equivalent. The software may be written in any type of computer language, such as C, C++, Java or even specialized proprietary languages. In practice, the steps, functions and actions to be described below are mapped into a computer program, which when being executed by the computer system effectuates the scene reconstruction in response to appropriate image data.

Of course, as will be appreciated by the skilled person, the invention is not limited to the system configuration of FIG. 1. In fact, the invention may be implemented in any suitable combination of hardware and software, even entirely in hardware using customized computational structures.

As mentioned earlier, the basic scene reconstruction problem consists in recovering the general 3-dimensional structure of a scene or object based on a sequence of uncalibrated images of different views of the scene. This generally corresponds to the case of a moving camera undergoing translation as well as rotation. It is also required to find the position and orientation of the camera for each view.

In order to fully understand the basic reconstruction problem as well as the solution proposed by present invention, it is useful to begin by briefly explaining the underlying camera model.

The Camera Model

Figure 2:
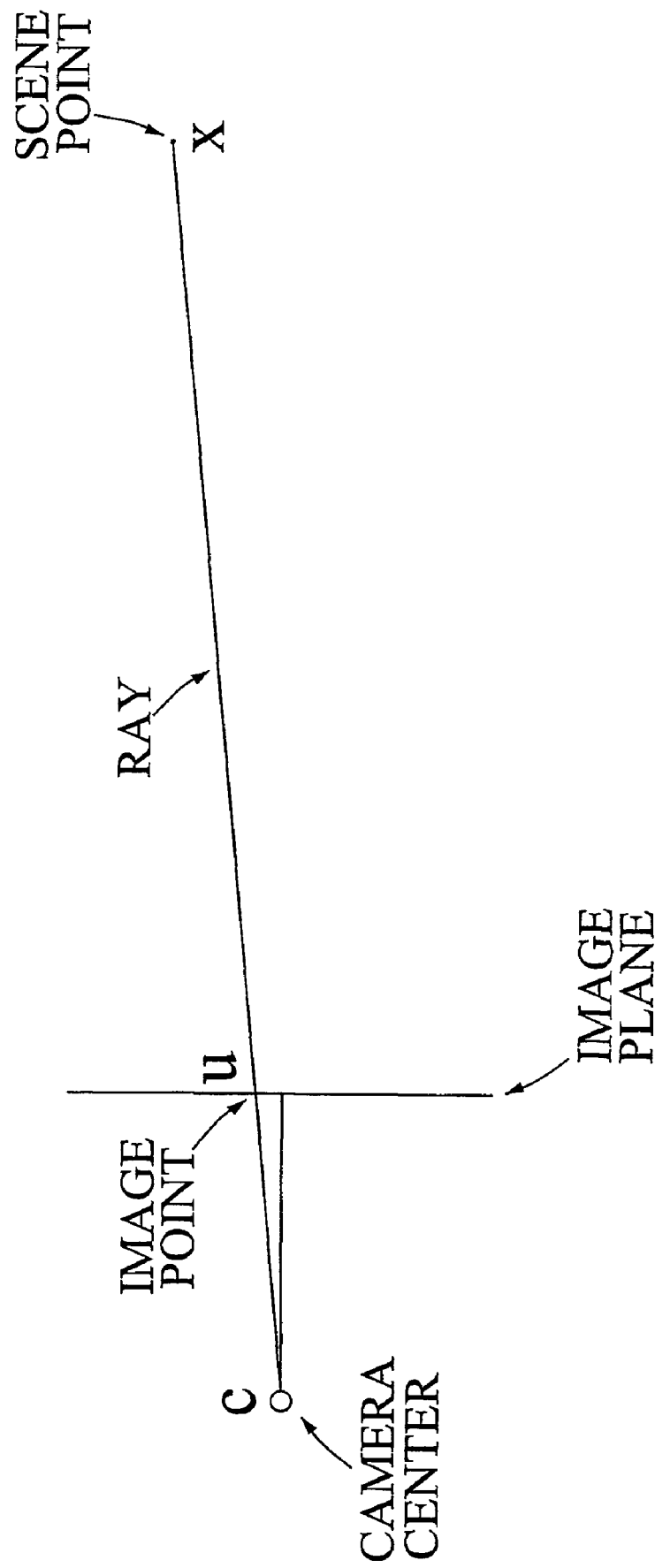
FIG. 2 is a schematic illustration of a camera model used by the invention.

FIG. 2 is a schematic illustration of a camera projection center c with an associated image plane, as well as a 3-dimensional point x and the corresponding image point u as seen by the camera. A commonly used model for perspective cameras involves projective mapping from 3-dimensional projective space to 2-dimensional projective space. The projective mapping may be represented by a 3×4 matrix P, called the camera matrix, and takes a 3-dimensional point x to an image point u=Px in the image plane. The camera matrix P may be decomposed into P=K(R|−Rt), alternatively expressed as P=KR(I|−t), where K is the calibration matrix of the camera, R is a rotation matrix representing the orientation of the camera with respect to an absolute coordinate frame and t represents the location of the camera. The calibration matrix K is generally an upper triangular matrix defined as:

$$K = \begin{bmatrix} k_1 & k_2 & k_3 \\ 0 & k_4 & k_5 \\ 0 & 0 & 1 \end{bmatrix}, \quad (1)$$

where $k_1$ to $k_5$ are the internal camera parameters defied as:
  $k_1$ relates to the focal length;
  $k_2$ corresponds to the skew;
  $k_3$ and $k_5$ corresponds to the coordinates of the principal point; and
  $k_4$ relates to the aspect ratio.

Projective Reconstruction

Consider a set of scene points $x_j$ that are seen from N camera views, simply referred to as cameras, with corresponding camera matrices P(n), where n is an integer from 1 to N. Based on a set of image correspondences $\{u_j^i\}$ between the different views, where $U_j^i$ are the coordinates of the j-th point as seen by the i-th camera, an initial reconstruction can generally be established by determining the camera matrices P(n) and the points $x_j$ such that $P(n)x_j$ equals $u_j^i$ up to a non-zero scale factor. Without any further restrictions on P(n) or $x_j$ such a reconstruction is called a projective reconstruction, because the points $x_j$ may differ from the true reconstruction $\bar{x}_j$ by an arbitrary 3-dimensional projective transformation H. In order to be able to view the true reconstruction of the scene in Euclidean space, the unknown projective transformation H has to be determined.

Finding the Plane at Infinity

As mentioned above, most conventional methods for determining the unknown projective transformation are based on enforcing constraints on the calibration of the cameras, so-called auto-calibration. However, since a projective transformation can move the plane at infinity, and hence have an arbitrary position in the projective reconstruction, the main obstacle in the process of determining the unknown projective transformation is to find the true plane at infinity in projective space. In order to facilitate the search for the true plane at infinity in the projective reconstruction, it has been proposed in [4], [5] and [6] to impose additional constraints on the reconstruction by using the cheiral inequalities for all points in the projective reconstruction. Ideally, this results in a quasi-affine projective reconstruction of the scene points and cameras, in which the plane to be mapped to infinity does not split the reconstructed scene in projective space.

Analysis of Conventional Cheirality-Based Methods

However, a careful analysis made by the inventor reveals that conventional cheirality-based methods for upgrading general projective reconstructions into quasi-affine reconstructions suffer from a number of basic problems with regard to convergence and stability. In particular, the methods presented in [4], [5] and [6] are very sensitive to bad points. Even if outliers are weeded out by carefully considering the geometry, there is bound to be one or two bad points in a set of ten thousand scene points due to uncertainty or unfortunately positioned outliers. In the presence of bad points, the cheiral inequalities as a whole are often unsolvable or simply give in an incorrect solution for the plane at infinity.

Figure 3A:
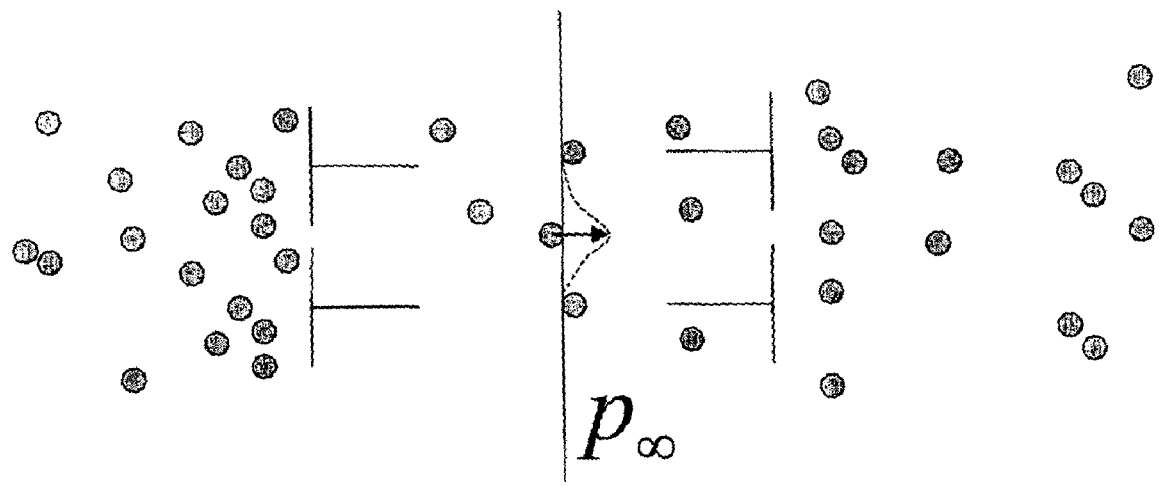
FIG. 3A is a schematic drawing illustrating how a small displacement of a single point may result in no valid solution to the full set of cheiral inequalities.

With reference to FIG. 3A, it is shown how a small displacement of a single point can change an otherwise perfect projective reconstruction so that there will be no valid position for the plane at infinity and hence no valid solution to the full set of cheiral inequalities. In this context, it is interesting to note the "points at infinity" in connection with the true plane (unknown) at infinity $p_\infty$. Here, such points have been observed in approximately opposite directions. In theory one then has a powerful constraint on the plane at infinity, as it would be possible to triangulate positions on the plane at infinity almost exactly as the only possible solution. However, with a small displacement due to uncertainty, as illustrated in FIG. 3A, the cheiral inequalities as a whole have no valid solution, and trying to solve them as described in [4] returns the null vector for the plane at infinity.

Figure 3B:
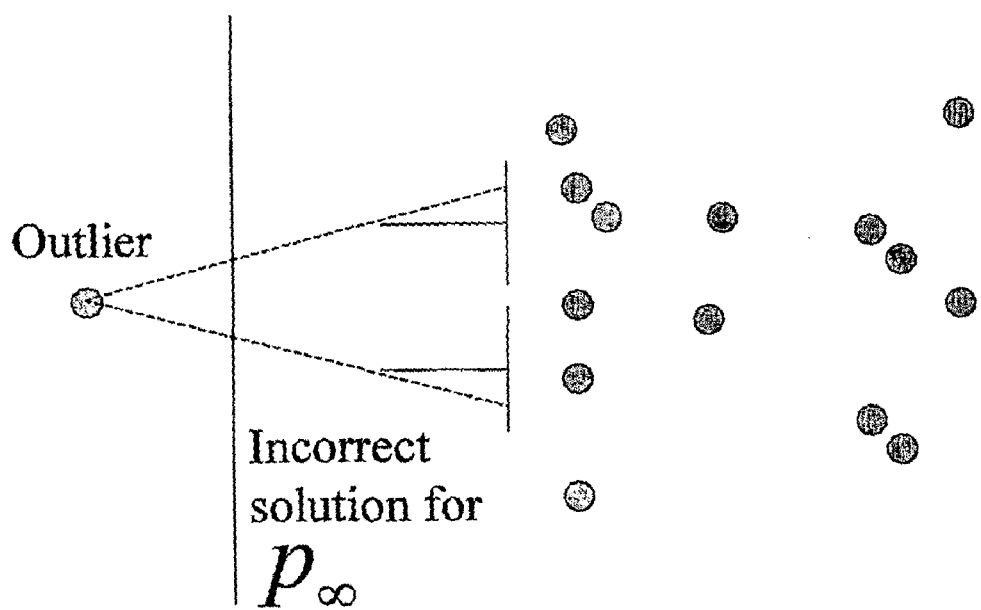
FIG. 3B is a schematic drawing illustrating how a single outlier may result in an incorrect solution to the full set of cheiral inequalities.

With reference to FIG. 3B, it is shown how a single outlier may result in an incorrect solution to the full set of cheiral inequalities. FIG. 3B illustrates an incorrect solution for the plane at infinity in Euclidean space. It is apparent that it only takes one or two unfortunately positioned outliers to change the polygonal solution region for the plane at infinity defined by the cheiral inequalities so that an incorrect solution is obtained.

The QUARC Reconstruction and Robust use of Cheirality

The present invention provides a robust and systematic strategy for using cheirality in scene reconstruction and camera calibration. Briefly, the idea according to the invention is to transform the initial projective reconstruction to a reconstruction that is explicitly enforced to be quasi-affine only with respect to the camera projection centers and possibly a fractional subset of the scene points of the initial projective reconstruction. In this regard, it is not assumed that it is possible to derive a set of cheiral inequalities that are solvable as a whole, but rather it is assumed that it is possible to find correct inequalities related to the cameras by statistical use of the scene points in a voting procedure that considers the cheirality of a plurality of scene points with respect to the cameras. In short, correct cheiral inequalities for the cameras are deduced by statistical voting. The cheiral inequalities for the cameras act as constraints on the position of the plane at infinity, and solving the inequalities gives a reconstruction that is quasi-affine with respect to the camera projection centers, also referred to as a QUARC reconstruction. Starting auto-calibration with a QUARC reconstruction is absolutely necessary for many iterative auto-calibration algorithms to converge. In practice, this also turns out to be sufficient, especially when using a physically meaningful objective function.

Now, the invention will be described in more detail with reference to a special algorithm for upgrading a projective reconstruction to a QUARC reconstruction according to a preferred embodiment of the invention. The following algorithm is customized for pairs of camera projection centers, and hence the theoretical background of the algorithm is also related to pairs of camera projection centers.

A projective transformation h is quasi-affine with respect to the camera projection centers if it preserves the convex hull of the camera projection centers, meaning that no point of the convex hull of the camera centers is transformed to the plane at infinity. A projective reconstruction is then simultaneously a QUARC reconstruction if a transformation that takes the reconstruction to a Euclidean counterpart is quasi-affine with respect to the set of camera projection centers.

It can be shown, considering the properties of the convex hull, that a projective reconstruction with camera centers $c(1), \ldots, c(N)$ is quasi-affine with respect to all camera centers if and only if it is quasi-affine with respect to every pair $c(n), c(n+1)$ of camera centers, where n=1 to N−1. This means that between any pair of camera centers $c(n), c(n+1)$ there is a continuous path in $\mathfrak{R}^3$ without points mapped to infinity, implying that the line segment between the camera centers is not intersected by the true plane at infinity. Consequently, all the camera centers lie on the same side of the plane mapped to infinity by h, meaning that the convex hull of the camera centers is not split by the plane at infinity.

Figure 4:
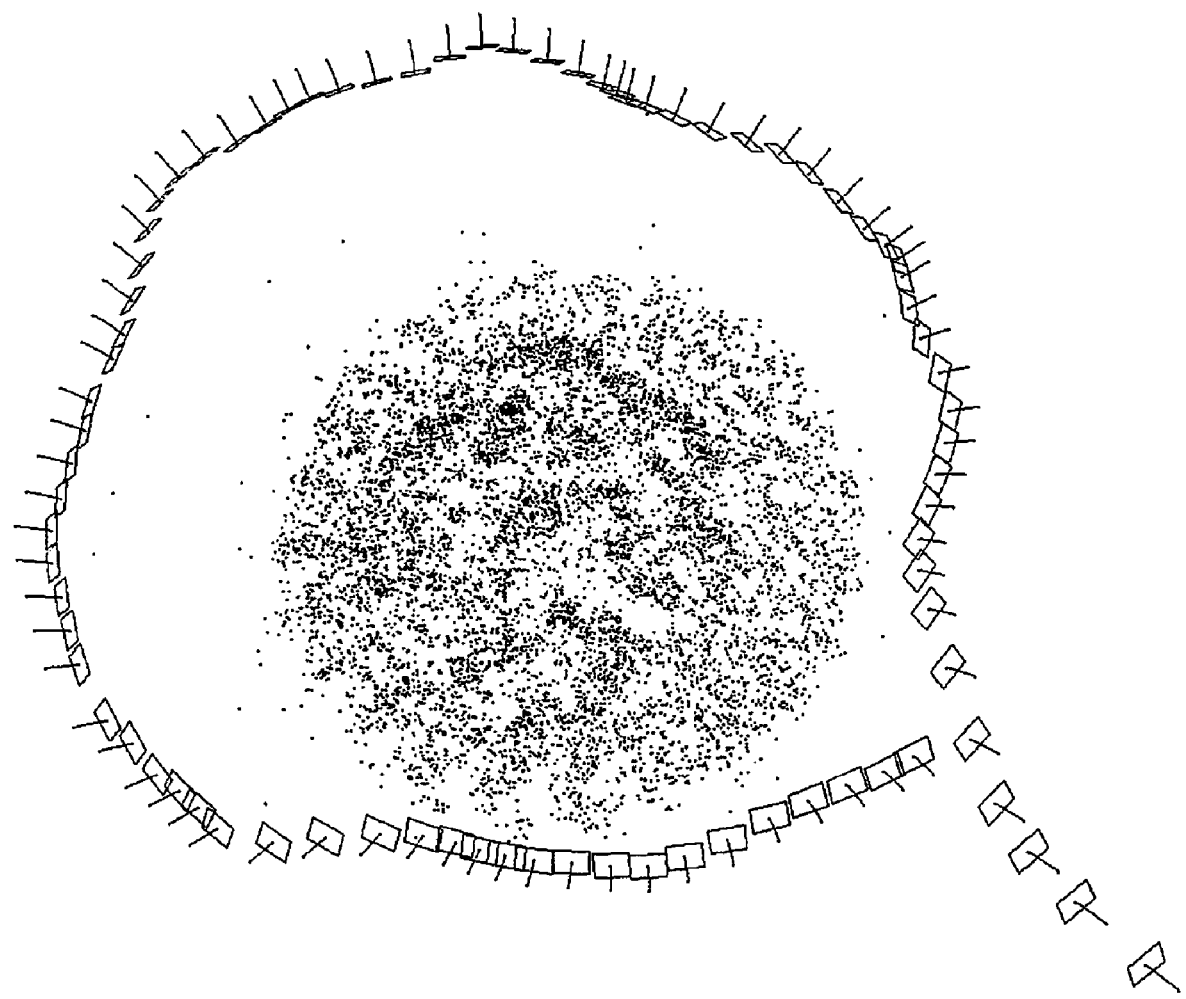
FIG. 4 illustrates a Euclidean reconstruction of a pot of flowers surrounded by reconstructed cameras.

At this point, it will be beneficial to give an illustration of what is a QUARC reconstruction and what is not. FIG. 4 illustrates a Euclidean reconstruction of a pot of flowers surrounded by reconstructed cameras. This is of course also a QUARC reconstruction and so is any projective equivalent for which the approximately circular trajectory of cameras is elliptical, preserving the convex hull of the cameras. However, the projective equivalent of FIG. 5 on the other hand is not a QUARC reconstruction since the circle of cameras in the Euclidean reconstruction has turned into a hyperbolic structure. The plane that should be mapped to infinity goes through the middle of the reconstruction, splitting the convex hull of the cameras.

Figure 5:
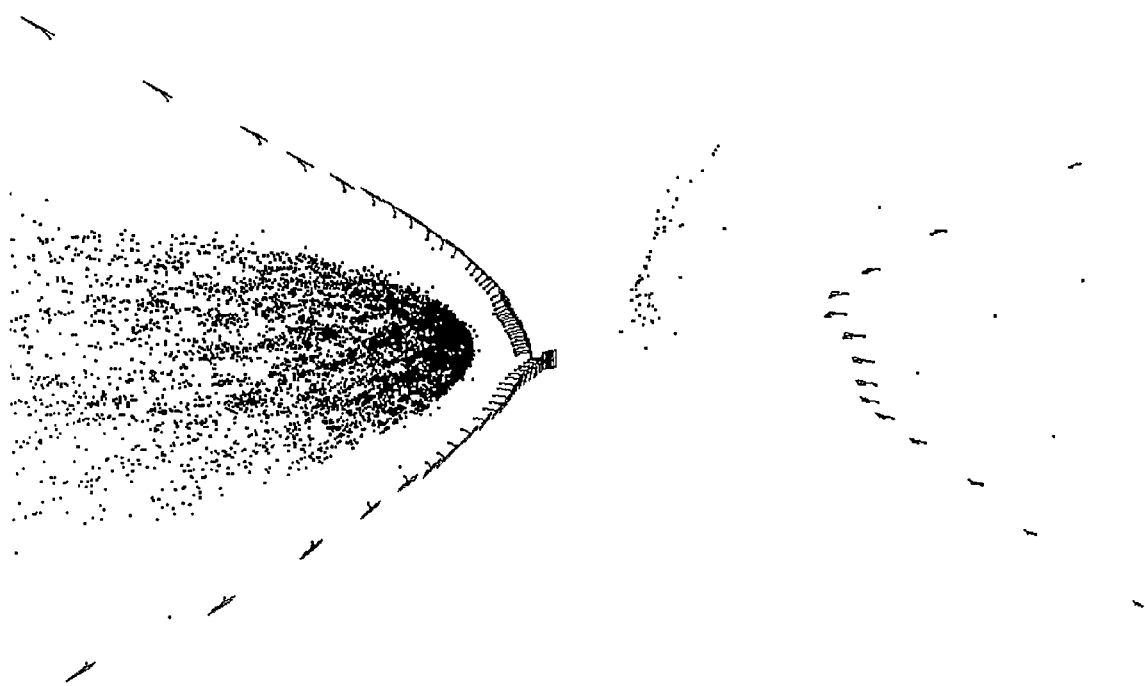
FIG. 5 illustrates a projective equivalent of the reconstruction of FIG. 4.

Given an arbitrary projective reconstruction of scene points and cameras, such as the one illustrated in FIG. 5, it is thus required to find a QUARC reconstruction such that the plane at infinity does not split the convex hull of the camera centers. According to the invention this can be done extremely robustly, without problems due to mismatched or misplaced points. Since it has already been pointed out that to obtain a QUARC reconstruction it is sufficient to ensure that the reconstruction is quasi-affine with respect to every pair of camera centers $c(n), c(n+1)$, the remaining question is how to ensure quasi-affinity for a pair of camera centers.

In reference [5] it has been shown that an affine transformation preserves cheirality with respect to a camera if and only if it has a positive determinant, and that the cheirality of a point is preserved by a projective transformation with a positive determinant if and only if the point lies on the same side of the plane at infinity as the camera center. Based on this knowledge, it can be deduced that a projective reconstruction is quasi-affine with respect to a pair of cameras if and only if a point imaged by the camera pair has the same cheirality with respect to both cameras, keeping in mind that the cheirality of a point with respect to a given camera indicates whether the point lies in front of or behind the camera.

A projective reconstruction is quasi-affine with respect to a pair of cameras if and only if the plane at infinity does not separate the camera centers. As shown above, this is true if and only if a point imaged by the camera pair has the same cheirality with respect to both cameras. Given an arbitrary projective reconstruction including a pair of cameras, determining whether the reconstruction is quasi-affine with respect to the camera pair essentially comes down to taking a binary decision. Either the current projective reconstruction is already QUARC, or the true plane at infinity separates the camera centers. This binary ambiguity can be resolved by a single point imaged by both cameras by considering the cheirality of the point with respect to the camera pair. However, if the point is incorrect or in the form of an unfortunately positioned outlier, the binary decision will automatically fail.

Deriving Cheiral Inequalities for the Cameras by Means of Statistical Voting

The solution according to the invention is to resolve the binary ambiguity by taking advantage of the fact that a pair of cameras typically has many points in common, especially if they represent consecutive views in a sequence. This abundance of statistics is used in a robust voting algorithm, giving each common point its own vote, as will be described in the following.

In order to write down the cheiral inequalities for the cameras, each camera is multiplied by +1 or −1 depending on the cheirality of a plurality of points with respect to the corresponding camera pair. Assuming that there are N cameras, represented by camera matrices P(1) to P(N), in a projective reconstruction, we multiply the camera matrices with +1 or −1 in the following way:

$$P(n) = P(n) \cdot \text{sign}\left(\frac{1}{2} + \sum_{b=1}^{L} \text{sign}[(P(n)X(b))_3 (P(n-1)X(b))_3]\right) \quad (2)$$

for $n = 2$ to $N$, where the expression $\text{sign}[(P(n)X(b))_3 (P(n-1)X(b))_3]$ is representative of the cheirality of the point $X(b)$ with respect to the cameras represented by $P(n)$ and $P(n-1)$, and the summation $$\sum_{b=1}^{L}$$

is performed over a plurality, L, of scene points X(b) seen by the pair of cameras represented by P(n) and P(n−1). The operation $(\text{arg})_3$ selects the third element of its argument arg. The function sign(x) is defined as:

$$\text{sign}(x) = \begin{cases} 1 & x > 0 \\ 0 & x = 0 \\ -1 & x < 0 \end{cases} \quad (3)$$

The essence of the above mathematical expressions is that a plurality of points, preferably all points, that are seen by both cameras of a camera pair are used in a cheirality-based voting procedure to determine the sign by which the corresponding camera matrix is to be multiplied, thus resolving the binary ambiguity with regard to the quasi-affinity for that camera pair. Repeating the voting procedure for all camera pairs in order resolves the binary ambiguity for all camera pairs, and accordingly for the whole set of N cameras. By using the robust "majority" voting procedure according to the invention the cameras will be multiplied with the correct signs with a very high probability.

Naturally, the voting may be performed with different weights being given to different points.

Each camera projection center c(n) is then calculated based on the corresponding camera matrix P(n), here simply expressed as P, in the following way:

$$c(n) = c^l(P) = (-1)^l \det(P_{j \neq l}^i), \; l = 1, \ldots, 4. \quad (4)$$

where $P_{j \neq l}^i$ is P with the l-th column removed. All camera centers, calculated as defined in expression (4) above with consideration to the robust sign multiplication in expression (2), and regarded as four-dimensional vectors in the vector space $\Re^4$, will now lie in one half of $\Re^4$. This generally means that they have the same sign on their scalar product with a vector $p_\infty$ representing the plane at infinity. As the sign of $p_\infty$ is insignificant, we may demand that:

$$p_\infty^T c(n) \geq 0 \; n = 1, \ldots, N. \quad (5)$$

This logical procedure yields effective constraints on the position of the plane at infinity. For this to fail, half or more of the points seen by some pair of cameras have to be outliers on the wrong side of the cameras or some cameras have to be gravely misplaced. Most outliers have already been removed by the geometric constraints and problems will typically not occur unless the sequence is 'broken' in the sense that the relation between the cameras has been lost somewhere due to a complete tracking failure.

Determining a Tentative Plane at Infinity by Linear Programming

For reasonable projective reconstructions, a tentative plane at infinity will be found as the vector $p_\infty$ such that the inequalities:

$$\frac{c^T(n)p_\infty}{|c^T(n)|} - \delta \geq 0 \quad n = 1, \ldots, N \quad -1 \leq (p_\infty)_i \leq 1 \; i = 1, \ldots, 4 \quad (6)$$

are satisfied with the largest scalar $\delta$. Finding this vector is a linear programming problem and can be solved very quickly by using the method outlined in reference [7]. When the vector $p_\infty$ has been found, the projective reconstruction is transformed with the transformation matrix:

$$H_1 = \begin{bmatrix} A \\ p_\infty^T \end{bmatrix}, \quad (7)$$

where A is the 3×4 matrix with zeros in the same column as the element in $p_\infty^T$ with largest magnitude and with the other three columns equal to the unit matrix. This transformation yields a QUARC reconstruction.

To bring it closer to the Euclidean, one can take a view P in the middle of the sequence and transform the whole reconstruction by:

$$H_2 = \begin{bmatrix} P \\ 0 & 1 \end{bmatrix} \quad (8)$$

and then normalize the scale of the reconstruction so that the median of motion from camera n to n+1 is $(N-1)^{-1}$. Finally, if the majority of points are behind rather than in front of the cameras, the reflection:

$$H_3 = \text{diag}(1, 1, 1, -1) \quad (9)$$

can be applied.

The Position of the Plane at Infinity in Relation to the Camera Centers

For a more intuitive and in-depth understanding of how cheirality is used to establish constraints on the position of the plane at infinity, reference will now be made to FIGS. 6-9.

Figure 6:
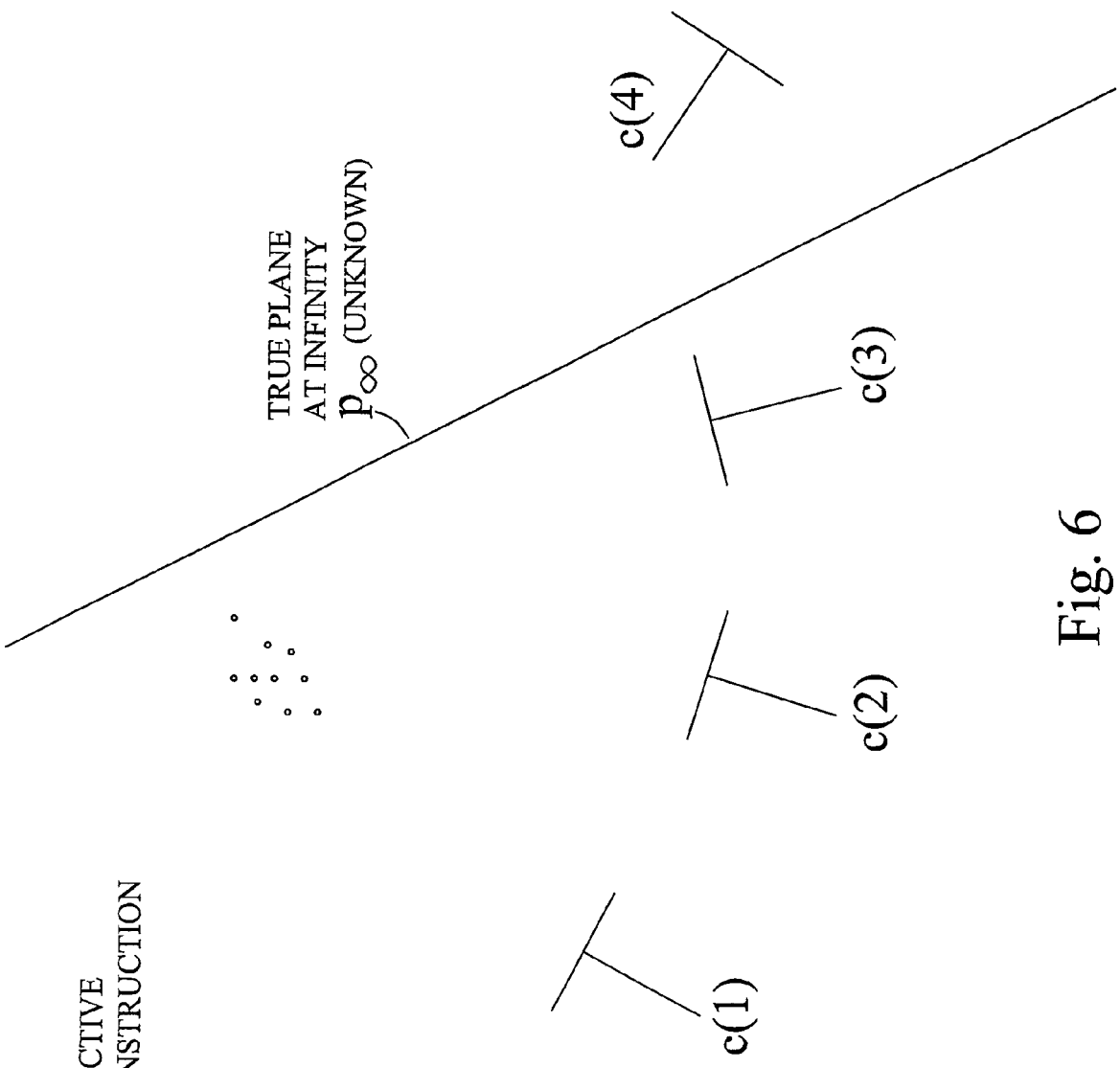
FIG. 6 is a schematic drawing of a projective reconstruction of a number of cameras and scene points.

FIG. 6 is a schematic drawing of a projective reconstruction of a number of cameras and scene points. The projective reconstruction includes a number of scene points and a number of cameras, out of which four cameras are shown. The cameras are associated with camera centers c(1), c(2), c(3) and c(4). The true plane at infinity $p_\infty$ (in other words the plane to be mapped to infinity in Euclidean space) has a well-defined but initially unknown position in the projective reconstruction.

For any set of camera centers, the true plane at infinity $p_\infty$ partitions the camera centers into two sets, including also the null set of camera centers and the full set of camera centers. In general, each point, provided it is correct, rules out a number of partitioning configurations for the plane at infinity in relation to the camera centers depending on in which cameras it is seen and for those cameras if it is in front of or behind the cameras. If it can be determined which partitioning configuration that is true for all camera centers, the position of the plane at infinity would be effectively constrained and a QUARC reconstruction obtained.

In the preferred embodiment of the invention, which considers pairs of camera centers, the constraints on the position of the plane at infinity are obtained by ruling out, for each pair of camera centers, a number of partitioning configurations.

Figure 7:
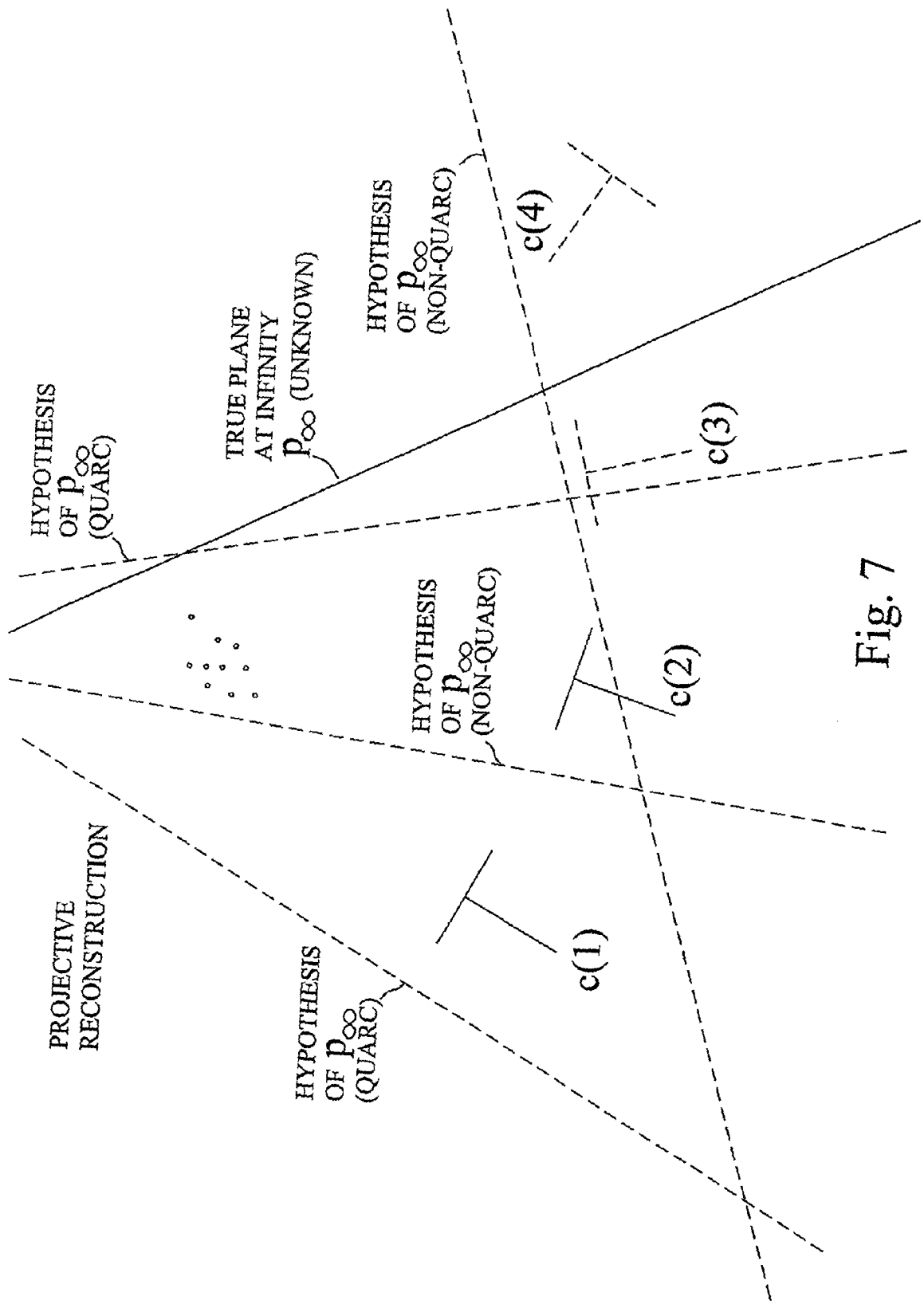
FIGS. 7, 8 and 9 are schematic drawings of the projective reconstruction of FIG. 6 illustrating a number of possible partitioning configurations for the plane at infinity with relation to different pairs of camera centers.

FIG. 7 is a schematic drawing of the projective reconstruction of FIG. 6 illustrating a number of possible partitioning configurations for the plane at infinity with relation to the camera centers c(1) and c(2). It can be seen from FIG. 7 that all scene points lie in front of both of the camera centers c(1) and c(2). All points have the same cheirality with respect to both cameras, and hence the reconstruction is quasi-affine with respect to these two camera centers. This means that the line segment between the camera centers c(1) and c(2) is not intersected by the true plane at infinity, and that any partitioning configuration for the plane at infinity that splits the camera centers can be ruled out. In the logical procedure for establishing the constraints, starting from the camera matrix P(1) associated with camera center c(1) and using expressions (2) and (4), the camera matrix P(2) and the associated camera center c(2) will be multiplied by +1.

Figure 8:
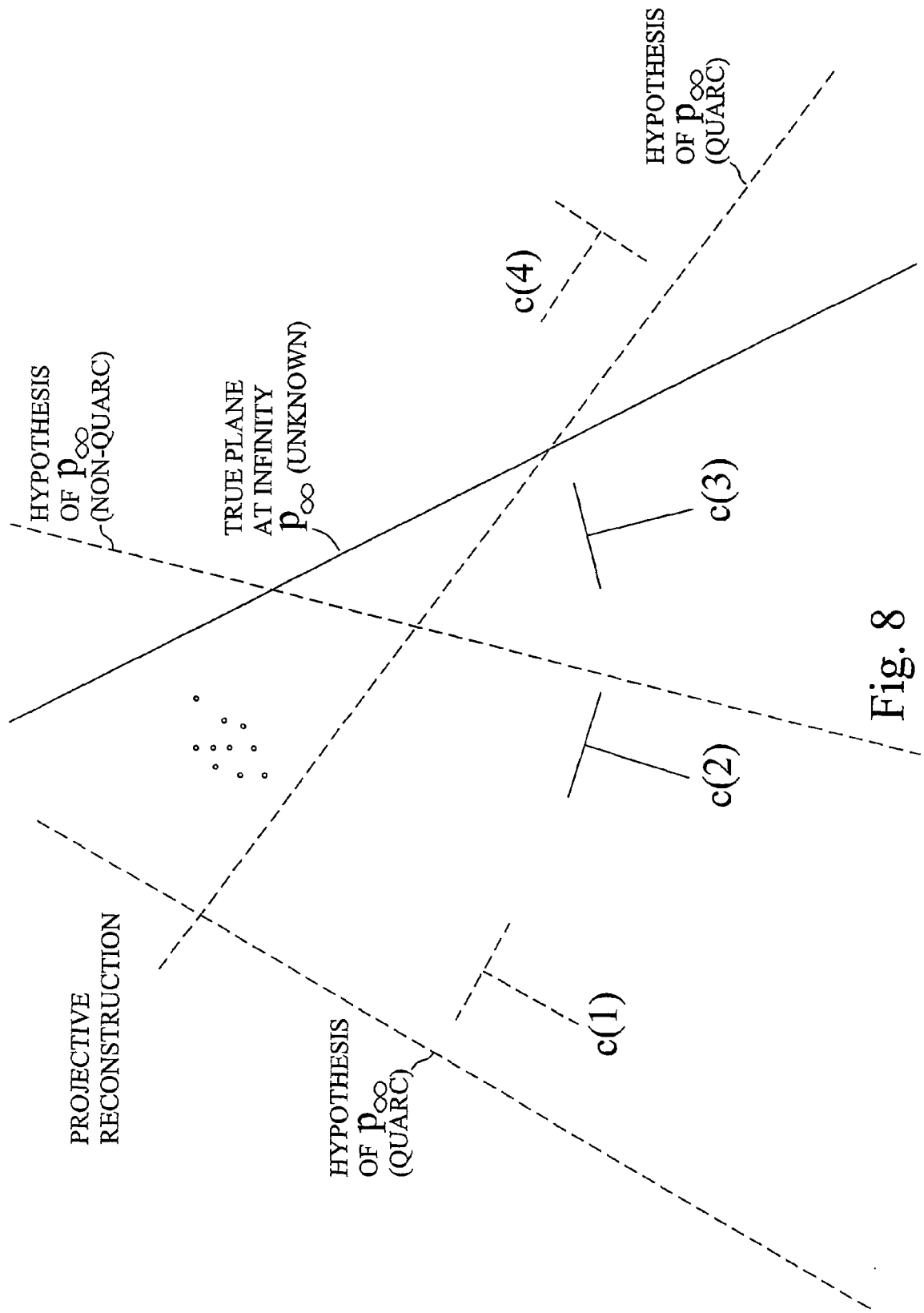

In order to further constrain the position of the plane at infinity, we continue by considering the camera centers c(2) and c(3). With reference to FIG. 8, it can be seen that all scene points lie in front of both of the camera centers c(2) and c(3). This means that the reconstruction is quasi-affine also with respect to these two camera centers, implying that the line segment between the camera centers c(2) and c(3) is not intersected by the true plane at infinity. Consequently, any partitioning configuration for the plane at infinity that splits the camera centers c(2) and c(3) can be ruled out. In the logical procedure, using expressions (2) and (4), this corresponds to a multiplication of the camera matrix P(3) and the associated camera center c(3) by +1.

Figure 9:
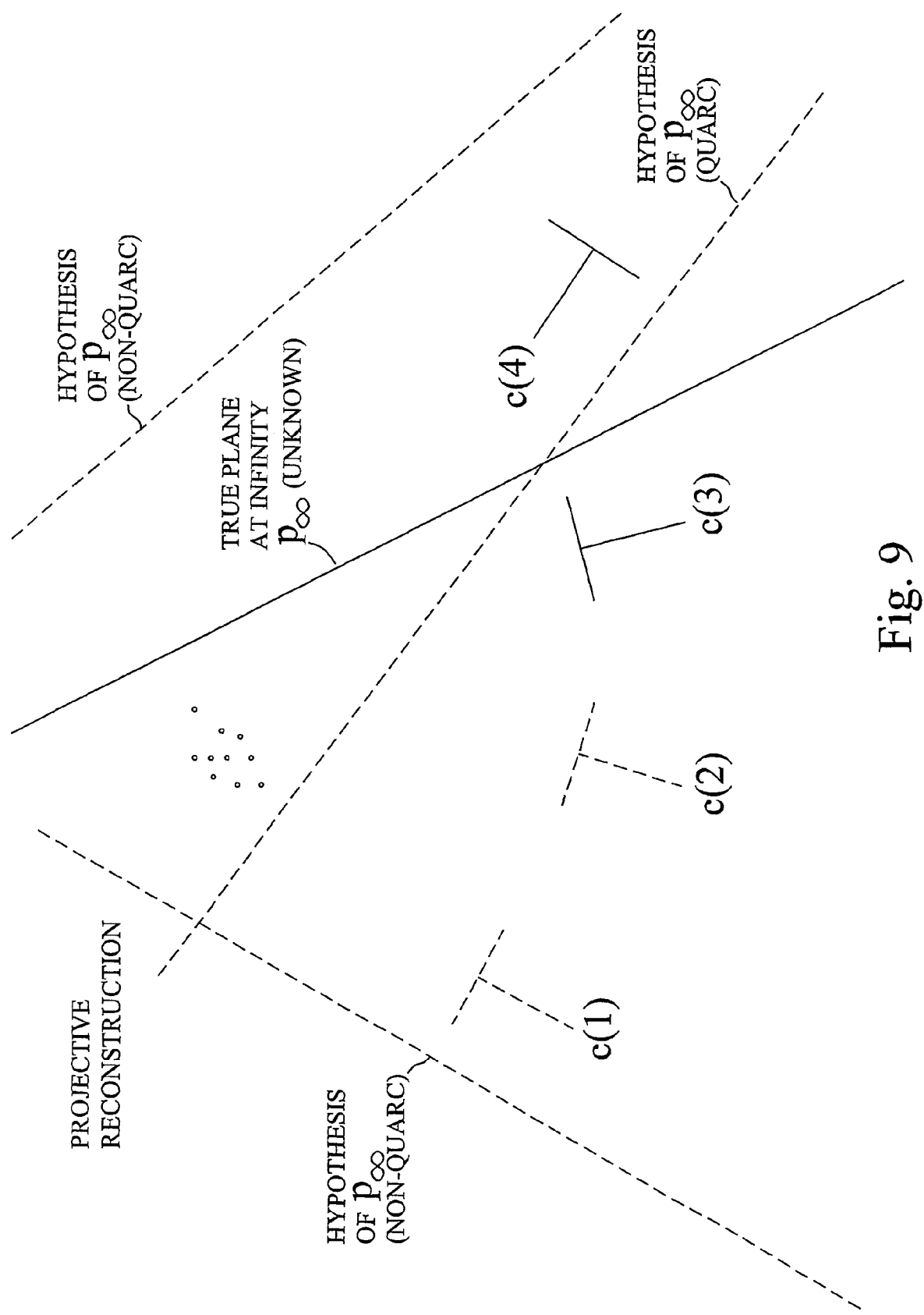

With reference to FIG. 9, it can be seen that the scene points are in front of camera center c(3), but behind camera center c(4). The scene points do not have the same cheirality with respect to cameras c(3) and c(4), and accordingly, the reconstruction is not quasi-affine with respect to these two cameras. This means that the line segment between the camera centers c(3) and c(4) must in fact be intersected by the true plane at infinity, giving a very powerful constraint on the position of the plane at infinity. In the logical procedure, this corresponds to a multiplication of the camera matrix P(4) and the associated camera center c(4) by −1.

By repeating this procedure for all pairs of camera centers in order, the plane at infinity is effectively constrained.

Auto-Calibration Optimization

As mentioned above, it turns out that starting the subsequent auto-calibration optimization from a QUARC reconstruction is a necessary condition for most auto-calibration algorithms to converge. In practice, a QUARC initialization is most often also a sufficient condition, provided that the optimized objective function is representative of a physically meaningful quantity.

The intrinsics of a camera is captured by its calibration matrix K, given above in expression (1), with the internal camera parameters relating to the focal length ($k_1$), skew ($k_2$), principal point ($k_3$, $k_5$) and aspect ratio ($k_4$). Generally, the skew of a camera can be assumed to be very close to zero. Furthermore, in most practical cases one has at least a very rough knowledge of the aspect ratio and principal point. The approximate knowledge of the intrinsics is used to choose the image coordinate system so that the aspect is approximately one, the principal point is near origo and the image dimensions are on the same order as the focal length. The unknown parameters that can really introduce severe distortion to a projective reconstruction are the three parameters for the plane at infinity and the unknown focal length of one camera. If the knowledge of the intrinsics apart from focal length would be assumed exact, the QUARC reconstruction from the previous section with a canonified camera would be a transformation $$H_4 = \begin{bmatrix} f & & & \\ & f & & \\ & & 1 & \\ v_1 & v_2 & v_3 & 1 \end{bmatrix} \quad (10)$$

away from a metric reconstruction. Here, f is the unknown focal length of the canonified camera and the three parameters $v^T = [v_1\ v_2\ v_3]$ are related to the plane at infinity. The proposed approach is to first concentrate only on these four parameters and optimize for them to remove most of the projective distortion before going into full bundle adjustment. This works remarkably well provided that the optimization is initialized with a QUARC reconstruction and that a meaningful objective function is minimized. The minimization is started from the QUARC reconstruction with $\hat{f}=1$ and $\hat{v}=0$. The objective function is constructed directly from the calibration matrices as follows. The reconstruction is transformed with the tentative transformation $\hat{H}_4$. The camera matrices are then factored into $P(n) \cong K(n) R(n)[I{-}t(n)]$, where R(n) is a rotation matrix and $$K(n) = \begin{bmatrix} k_1 & k_2 & k_3 \\ & k_4 & k_5 \\ & & 1 \end{bmatrix} \quad k_1 \geq 0, k_4 \geq 0 \quad (11)$$

The novel objective function according to a preferred embodiment of the invention is then defined as a sum of residuals r(n) for all cameras:

$$\sum_{n=1}^{N} r(n), \quad (12)$$

where $$r(n) = (k_1 + k_4)^{-2} (\alpha_1 k_2^2 + \alpha_2 (k_3^2 + k_5^2) + \alpha_3 (k_1 - k_4)_2). \quad (13)$$

The constants $\alpha_1, \alpha_2, \alpha_3$ are determined from the degree of confidence one has in the a priori assumptions on the skew, principal point and aspect, respectively. For simplicity, they may all be set to one. The well-known Levenberg-Marquardt method, described for example in reference [8], can be used to perform the actual minimization. The normalization by the factor $(k_1+k_4)^{-2}$, which is approximately proportional to the estimated focal length has been found to prevent collapse of the focal length in near degenerate situations. It is clearly needed for the third term in expression (13) to get the fractional deviation of the aspect from one. It can also be motivated for the term representing the deviation of the principal point from origo, since a deviation there is more tolerable when the focal length is large. A similar argument applies to the skew. For optimal quality, the scene reconstruction proceeds with full bundle adjustment, which is a conventional method for joint refinement of all points and all cameras simultaneously by local descent optimization. For a modern and complete guide to bundle adjustment, reference is made to [9].

Flow Diagram

Figure 10:
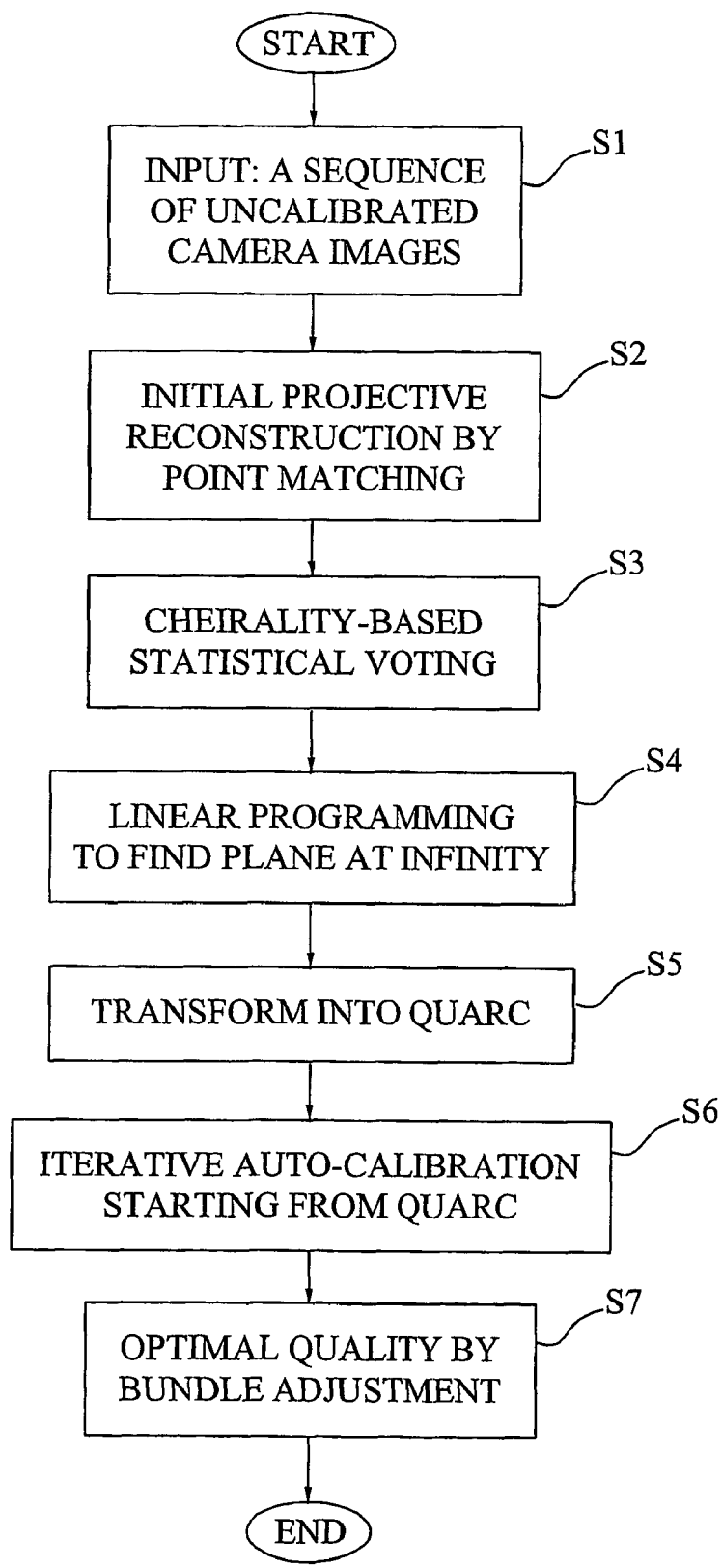
FIG. 10 is a schematic flow diagram of a scene reconstruction method according to a preferred embodiment of the invention.

In order to summarize the basic features of the present invention, reference will now be made to FIG. 10, which is a schematic flow diagram of a scene reconstruction method according to a preferred embodiment of the invention. In step S1, a sequence of uncalibrated images taken from different views is acquired and used as input for scene reconstruction. Step S2 basically involves the creation of an initial projective reconstruction based on conventional point matching between the images, for example as described in references [4] and [10]. In step S3, the cheirality-based statistical voting according to the invention is performed in order to establish a number of cheirality constraints for the different camera views. In step S4, these cheirality constraints, expressed as cheiral inequalities, are then used in a linear programming task to find a tentative plane at infinity. In step S5, the tentative estimate of the plane at infinity is used for transforming the initial projective reconstruction into a QUARC reconstruction. Next, the iterative auto-calibration process is initialized with the QUARC reconstruction as input, resulting in a Euclidean scene reconstruction of good quality (step S6). For optimal quality, full bundle adjustment is performed in step S7.

Experiments

Extensive experiments on projective reconstructions derived from real world sequences have shown that finding a QUARC reconstruction using cheirality-based voting and linear programming followed by optimization with a meaningful objective function yields excellent results. First, the cheirality-based voting gives correct and relevant constraints to obtain a QUARC reconstruction with a very high level of probability. Second, initializing the auto-calibration optimization with QUARC reconstructions consistently produces results that can be taken to optimal quality by full bundle adjustment.

Alternative Embodiments

As a complement to deducing cheiral inequalities for the cameras only, it is possible to narrow the search for the true plane at infinity even further by considering different hypotheses for the plane at infinity and accepting hypotheses based on cheirality for the scene points, but without requiring correct cheirality for all scene points. In practice, this means accepting those hypotheses for which the number of satisfied cheiral inequalities exceeds a given threshold level. Typically, a search is performed over the three degrees of freedom for the plane at infinity, testing all possible positions for the plane at infinity using a conventional search grid. For each hypothesis for the plane at infinity the following steps are performed:

1. Test the hypothesis with respect to the cheiral camera inequalities. If the camera inequalities are satisfied, then proceed to step 2, else discard the hypothesis.
2. Test the hypothesis with respect to the cheiral point inequalities. If a given percentage, say 90%, or more of the cheiral point inequalities are satisfied, then accept the hypothesis, else discard the hypothesis.

In order to determine which one of the accepted hypotheses for the plane at infinity to select, conventional optimization, for example as outlined in reference [6], is applied.

The strategy of only requiring that a fractional subset of the cheiral point inequalities should be correct can be used independently of the proposed statistical voting procedure, even without requiring correct cheirality for all the cameras, to avoid failure in the presence of bad points. However, testing all inequalities for a huge number of hypotheses is computationally demanding, and not always suitable for real-time applications.

Although, the preferred embodiments of the invention typically involves performing statistical voting and deriving cheiral inequalities with respect to pairs of cameras, there is nothing that prevents other camera subsets from being used instead.

In general, the cameras, or more specifically the camera projection centers, are divided into a number of unique subsets with at least two camera centers in each subset. Subsequently, for each subset, a constraint on the position of the plane at infinity is established by means of voting based on the cheirality of a plurality of scene points with respect to at least two of the camera centers within the relevant subset. For example, the camera centers may be divided into subsets of three camera centers. One way of performing the voting, for each subset, is to consider those points that are imaged by all three cameras. In another example, the camera centers are divided into subsets of increasing size as illustrated in Table I below.

TABLE I

| Subset | Camera centers |
|---|---|
| A | {1, 2} |
| B | {1, 2, 3} |
| C | {1, 2, 3, 4} |
| D | {1, 2, 3, 4, 5} |

In order to perform statistical voting, it is necessary to find a plurality of points that are imaged by two or more cameras in the relevant subset and consider the cheirality of the points with respect to the cameras in which they are seen. For example, there may be scene points that are imaged by camera centers 1 and 5 in subset D and/or scene points that are imaged by camera centers 2, 3 and 5 in subset D.

The embodiments described above are merely given as examples, and it should be understood that the present invention is not limited thereto. Further modifications, changes and improvements which retain the basic underlying principles disclosed and claimed herein are within the scope and spirit of the invention.

REFERENCES

[1] S. Maybank and O. Faugeras. A theory of self-calibration of a moving camera, *International Journal of Computer Vision*, 8(2):123-151, 1992.

[2] M. Pollefeys, R. Koch and L. Van Gool. Self-calibration and metric reconstruction in spite of varying and unknown internal camera parameters, *International Journal of Computer Vision*, 32(1):7-26, 1999.

[3] A. Heyden and K. Åström. Flexible calibration: Minimal cases for auto-calibration Proc. $7^{th}$ *International Conference on Computer Vision*, Volume 1, pages 350-355, 1999.

[4] R. Hartley. Euclidean reconstruction from uncalibrated views, *Lecture Notes in Computer Science*, Volume 825, pages 237-256, Springer Verlag, 1994.

[5] R. Hartley. Cheirality. *International Journal of Computer Vision*, 26(1):41-61, 1998.

[6] R. Hartley, E. Hayman, L. de Agapito and I. Reid. Camera calibration and the search for infinity, *Proc. $7^{th}$ International Conference on Computer Vision*, Volume 1, pages 510-517, 1999.

[7] W. Press, S. Teukolsky, W. Vetterling and B. Flannery. *Numerical recipes in C*, ISBN 0-521-43108-5, pages 430-443,Cambridge University Press, 1988.

[8] W. Press, S. Teukolsky, W. Vetterling and B. Flannery. *Numerical recipes in C*, ISBN 0-521-43108-5, pages 681-688, Cambridge University Press, 1988.

[9] B. Triggs, P. McLauchlan, R. Hartley and A. Fitzgibbon. Bundle adjustment—a modern synthesis, *Lecture Notes in Computer Science*, Volume 1883, pages 298-327, Springer Verlag, 2000.

[10] D. Nistér. Reconstruction from uncalibrated sequences with a hierarchy of trifocal tensors, *Proc. European Conference on Computer Vision*, Volume 1, pages 649-663, 2000.

The invention claimed is:

1. A method for reconstructing a Euclidean 3-dimensional scene from a number of uncalibrated 2-dimensional images of the scene, said method comprising the steps of:

establishing a first projective scene reconstruction based on image correspondences between the uncalibrated images:

transforming the first projective scene reconstruction into a second projective scene reconstruction that is explicitly enforced to be quasi-affine only with respect to camera projection centers and a fractional subset of the scene points of the first projective scene reconstruction; and transforming the second projective scene reconstruction into a Euclidean scene reconstruction, wherein said step of transforming the first projective scene reconstruction into a second projective scene reconstruction includes the steps of:

establishing a number of constraints on the position of the plane at infinity based on a voting procedure in which the cheirality of a plurality of scene points with respect to camera projection centers is considered; and determining a transformation for transforming said first projective scene reconstruction into said second projective scene reconstruction based on the established constraints.

2. The method according to claim 1, wherein said fractional subset of scene points is a null set.

3. The method according to claim 1, wherein said step of establishing a number of constraints includes the steps of:

dividing said camera projection centers into unique camera center subsets, each camera center subset comprising at least two camera projection centers; and establishing, for each camera center subset, a constraint on the position of the plane at infinity based on the cheirality of a plurality of scene points with respect to at least two camera projection centers of the camera center subset.

4. The method according to claim 3, wherein said step of establishing a constraint for each camera center subset includes the step of:

ruling out, for each camera center subset, a number of partitioning configurations for the plane at infinity in relation to the camera projection centers of the camera center subset based on said cheirality, whereby the position of the plane at infinity is effectively constrained as the camera center subsets are traversed in sequential order.

5. The method according to claim 3, wherein said camera projection centers are divided into pairs, and said step of establishing a number of constraints is performed with respect to each pair $c(n)$, $c(n+1)$ of camera projection centers, where n=1 to N−1 and N equals the total number of camera projection centers.

6. The method according to claim 5, wherein said step of establishing a number of constraints includes the step of:

deriving a number of inequality constraints on the position of the plane at infinity $p_{2\infty}$ as:

$$p_\infty^T c(n) \geq 0 \quad n=1, \ldots, N,$$

where c(n) is calculated based on a corresponding camera matrix P(n) determined as:

$$P(n) = P(n) \cdot \text{sign}\left(\frac{1}{2} + \sum_b \text{sign}[(P(n)X(b))_3 (P(n-1)X(b))_3]\right) \text{ for } n = 2 \text{ to } N,$$

where the summation $$\sum_b$$

performed over a plurality of scene points X(b) seen by the pair of camera projection centers represented by P(n) and P(n−1), the operation $(\text{arg})_3$ selects the third element of its argument, arg, and the function sign(x) is defined as:

$$\text{sign}(x) = \begin{cases} 1 & x > 0 \\ 0 & x = 0 \\ -1 & x < 0 \end{cases}.$$

7. The method according to claim 6, wherein the step of determining a transformation for transforming said first projective scene reconstruction into said second projective scene reconstruction based on the constraints includes the steps of:

solving a linear programming task defined as finding a tentative plane at infinity $p_\infty$ such that the inequalities:

$$\frac{c^T(n) p_\infty}{|c^T(n)|} - \delta \geq 0 \quad n = 1, \ldots, N \quad -1 \leq (p_\infty)_i \leq 1 \quad i = 1, \ldots, 4$$

are satisfied with the largest scalar δ; and
determining the transformation as:

$$H_1 = \begin{bmatrix} A \\ p_\infty^T \end{bmatrix},$$

where A is a 3×4 matrix with zeros in the same column as the element in $p_\infty^T$ with largest magnitude and with the other three columns equal to the unit matrix.

8. The method according to claim 1, wherein said step of transforming the second projective scene reconstruction into a Euclidean scene reconstruction includes:

optimizing the corresponding projective-to-Euclidean transformation with respect to an objective function, which at least partly is based on a representation of camera focal length.

9. The method according to claim 8, wherein said objective function involves a normalization factor, which is approximately proportional to an estimate of camera focal length.

10. The method according to claim 8, wherein said objective function is defined as:

$$\sum_{n=1}^N r(n),$$

where $r(n)=(k_1+k_4)^{-2}(\alpha_1 k_2^2 + \alpha_2(k_3^2+k_5^2) + \alpha_3(k_1-k_4)^2)$ with $k_1$ to $k_5$ obtained from the corresponding camera calibration matrix K(n), where n is an integer from 1 to N, and N is the total number of cameras, given as:

$$K(n) = \begin{bmatrix} k_1 & k_2 & k_3 \\ & k_4 & k_5 \\ & & 1 \end{bmatrix} \quad k_1 \geq 0, k_4 \geq 0,$$

where $k_1$ to $k_5$ are internal camera parameters defined as:
$k_1$ relates to the focal length;
$k_2$ corresponds to the skew;
$k_3$ and $k_5$ corresponds to the coordinates of the principal point; and
$k_4$ relates to the aspect ratio,
and $\alpha_1, \alpha_2, \alpha_3$ are constants determined from the degree of confidence in the a priori assumptions on the skew, principal point and aspect, respectively.

11. A method for upgrading a first projective scene reconstruction based on uncalibrated 2-dimensional images into a second quasi-affine projective scene reconstruction, said method comprising the steps of:

establishing a number of constraints on the position of the plane at infinity based on a voting procedure in which the cheirality of a plurality of scene points with respect to camera projection centers is considered; and determining a transformation for transforming said first projective scene reconstruction into said second quasi-affine projective scene reconstruction based on the established constraints.

12. The method according to claim 11, wherein said step of establishing a number of constraints includes the steps of:

dividing said camera projection centers into unique camera center subsets, each camera center subset comprising at least two camera projection centers; and establishing, for each camera center subset, a constraint on the position of the plane at infinity based on the cheirality of a plurality of scene points with respect to at least two camera projection centers of the camera center subset.

13. The method according to claim 12, wherein said step of establishing a constraint for each camera center subset includes the step of:

ruling out, for each camera center subset, a number of partitioning configurations for the plane at infinity in relation to the camera projection centers of the camera center subset based on said cheirality, whereby the position of the plane at infinity is effectively constrained as the camera center subsets are traversed in sequential order.

14. The method according to claim 12, wherein said camera projection centers are divided into pairs, and said step of establishing a number of constraints is performed with respect to each pair c(n), c(n+1) of camera projection centers, where n=1 to N−1 and N equals the total number of camera projection centers.

15. The method according to claim 14, wherein said step of establishing a number of constraints includes the step of:
deriving a number of inequality constraints on the position of the plane at infinity $p_\infty$ as:

$p_\infty^T c(n) \geqq 0$ $n=1, \ldots, N,$ where c(n) is calculated based on a corresponding camera matrix P(n) determined as:

$$P(n) = P(n) \cdot \text{sign}\left(\frac{1}{2} + \sum_b \text{sign}[(P(n)X(b))_3(P(n-1)X(b))_3]\right) \text{ for } n = 2 \text{ to } N,$$

where the summation $$\sum_b$$

performed over a plurality of scene points X(b) seen by the pair of camera projection centers represented by P(n) and P(n−1), the operation (arg)$_3$ selects the third element of its argument, arg, and the function sign(x) is defined as:

$$\text{sign}(x) = \begin{cases} 1 & x > 0 \\ 0 & x = 0 \\ -1 & x < 0 \end{cases}.$$

16. The method according to claim 15, wherein the step of determining a transformation for transforming said first projective scene reconstruction into said second projective scene reconstruction based on the constraints includes the steps of
solving a linear programming task defined as finding a tentative plane at infinity $p_\infty$ such that the inequalities:

$$\frac{c^T(n)p_\infty}{|c^T(n)|} - \delta \geq 0 \quad n = 1, \ldots, N \quad -1 \leq (p_\infty)_i \leq 1 \; i = 1, \ldots, 4$$

are satisfied with the largest scalar δ; and
determining the transformation as:

$$H_1 = \begin{bmatrix} A \\ p_\infty^T \end{bmatrix},$$

where A is a 3×4 matrix with zeros in the same column as the element in $p_\infty^T$ with largest magnitude and with the other three columns equal to the unit matrix.

17. A system for reconstructing a Euclidean 3-dimensional scene from a number of uncalibrated 2-dimensional images of the scene, said system comprising:
means for establishing a first projective scene reconstruction based on image correspondences between the uncalibrated images;
means for transforming the first projective scene reconstruction into a second projective scene reconstruction that is explicitly enforced to be quasi-affine only with respect to camera projection centers and a fractional subset of the scene points of the first projective scene reconstruction; and
means for transforming the second projective scene reconstruction into a Euclidean scene reconstruction,
wherein said means for transforming the first projective scene reconstruction into a second projective scene reconstruction includes:
means for establishing a number of constraints on the position of the plane at infinity based on a voting procedure in which the cheirality of a plurality of scene points with respect to camera projection centers is considered; and
means for determining a transformation for transforming said first projective scene reconstruction into said second projective scene reconstruction based on the established constraints.

18. The system according to claim 17, wherein said fractional subset of scene points is a null set.

19. The system according to claim 17, wherein said means for establishing a number of constraints includes:
means for dividing said camera projection centers into unique camera center subsets, each camera center subset comprising at least two camera projection centers; and
means for establishing, for each camera center subset, a constraint on the position of the plane at infinity based on the cheirality of a plurality of scene points with respect to at least two camera projection centers of the camera center subset.

20. The system according to claim 19, wherein said means for establishing a constraint for each camera center subset includes:
means for ruling out, for each camera center subset, a number of partitioning configurations for the plane at infinity in relation to the camera projection centers of the camera center subset based on said cheirality, whereby the position of the plane at infinity is effectively constrained as the camera center subsets are traversed in sequential order.

21. The system according to claim 19, wherein said camera projection centers are divided into pairs, and said means for establishing a number of constraints is operative for performing the constraint establishment with respect to each pair c(n), c(n+1) of camera projection centers, where n=1 to N−1 and N equals the total number of camera projection centers.

22. The system according to claim 21, wherein said means for establishing a number of constraints includes:
means for deriving a number of inequality constraints on the position of the plane at infinity $p_\infty$ as:

$p_\infty^T c(n) \geqq 0$ $n=1, \ldots, N,$ where c(n) is calculated, by a processing unit, based on a corresponding camera matrix P(n) determined as:

$$P(n) = P(n) \cdot \text{sign}\left(\frac{1}{2} + \sum_b \text{sign}[(P(n)X(b))_3(P(n-1)X(b))_3]\right) \text{ for } n = 2 \text{ to } N,$$

where the summation $$\sum_b$$

performed by the processing unit over a plurality of scene points X(b) seen by the pair of camera projection centers represented by P(n) and P(n−1), the operation (arg)₃ selects the third element of its argument, arg, and the function sign(x) is defined as:

$$\text{sign}(x) = \begin{cases} 1 & x > 0 \\ 0 & x = 0 \\ -1 & x < 0 \end{cases}$$

23. The system according to claim 22, wherein said means for determining a transformation for transforming said first projective scene reconstruction into said second projective scene reconstruction based on the constraints includes:

means for solving a linear programming task defined as finding a tentative plane at infinity $p_\infty$ such that the inequalities:

$$\frac{c^T(n)p_\infty}{|c^T(n)|} - \delta \geq 0 \quad n = 1, \ldots, N \quad -1 \leq (p_\infty)_i \leq 1 \; i = 1, \ldots, 4$$

are satisfied with the largest scalar δ; and
means determining the transformation as:

$$H_1 = \begin{bmatrix} A \\ p_\infty^T \end{bmatrix},$$

where A is a 3×4 matrix with zeros in the same column as the element in $p_\infty^T$ with largest magnitude and with the other three columns equal to the unit matrix.

24. The system according to claim 17, wherein said means for transforming the second projective scene reconstruction into a Euclidean scene reconstruction includes:

means for optimizing the corresponding projective-to-Euclidean transformation with respect to an objective function, which at least partly is based on a representation of camera focal length.

25. The system according to claim 24, wherein said objective function involves a normalization factor, which is approximately proportional to an estimate of camera focal length.

26. The system according to claim 24, wherein said objective function is defined as:

$$\sum_{n=1}^{N} r(n),$$

where $r(n) = (k_1 + k_4)^{-2}(\alpha_1 k_2^2 + \alpha_2(k_3^2 + k_5^2) + \alpha_3(k_1 - k_4)^2)$ with $k_1$ to $k_5$ obtained from the corresponding camera calibration matrix K(n), where n is an integer from 1 to N, and N is the total number of cameras, given as:

$$K(n) = \begin{bmatrix} k_1 & k_2 & k_3 \\ & k_4 & k_5 \\ & & 1 \end{bmatrix} \quad k_1 \geq 0, k_4 \geq 0,$$

where $k_1$ to $k_5$ are internal camera parameters defined as:
$k_1$ relates to the focal length;
$k_2$ corresponds to the skew;
$k_3$ and $k_5$ corresponds to the coordinates of the principal point; and
$k_4$ relates to the aspect ratio,
and $\alpha_1$, $\alpha_2$, $\alpha_3$ are constants determined from the degree of confidence in the a priori assumptions on the skew, principal point and aspect, respectively.

27. A system for upgrading a first projective scene reconstruction based on uncalibrated 2-dimensional images into a quasi-affine projective scene reconstruction, said system comprising:

means for establishing a number of constraints on the position of the plane at infinity based on a voting procedure in which the cheirality of a plurality of scene points with respect to camera projection centers is considered; and means for determining a transformation for transforming said first projective scene reconstruction into said second projective scene reconstruction based on the established constraints.

28. The system according to claim 27, wherein said means for establishing a number of constraints includes:

means for dividing said camera projection centers into unique camera center subsets, each camera center subset comprising at least two camera projection centers; and means for establishing, for each camera center subset, a constraint on the position of the plane at infinity based on the cheirality of a plurality of scene points with respect to at least two camera projection centers of the camera center subset.

29. The system according to claim 28, wherein said camera projection centers are divided into pairs, and said means for establishing a number of constraints is operative for performing said constraint establishment with respect to each pair c(n), c(n+1) of camera projection centers, where n=1 to N−1 and N equals the total number of camera projection centers.

30. The system according to claim 29, wherein said means for establishing a number of constraints includes:

means for deriving a number of inequality constraints on the position of the plane at infinity $p_{28}$ as:

$$p_\infty^T c(n) \geq 0 \; n=1, \ldots, N,$$

where c(n) is calculated, by a processing unit, based on a corresponding camera matrix P(n) determined as:

$$P(n) =$$

$$P(n) \cdot \text{sign}\left(\frac{1}{2} + \sum_b \text{sign}[(P(n)X(b))_3 (P(n-1)X(b))_3]\right) \text{ for } n = 2 \text{ to } N,$$

where the summation $$\sum_b$$

is performed by the processing unit over a plurality of scene points X(b) seen by the pair of camera projection centers represented by P(n) and P(n−1), the operation (arg)$_3$ selects the third element of its argument, arg, and the function sign(x) is defined as:

$$\text{sign}(x) = \begin{cases} 1 & x > 0 \\ 0 & x = 0 \\ -1 & x < 0 \end{cases}.$$

31. The system according to claim 30, wherein said means for determining a transformation for transforming said first projective scene reconstruction into said second projective scene reconstruction based on the constraints includes:
means for solving a linear programming task defined as finding a tentative plane at infinity p$_\infty$ such that the inequalities:

$$\frac{c^T(n)p_\infty}{|c^T(n)|} - \delta \geq 0 \quad n = 1, \ldots, N \quad -1 \leq (p_\infty)_i \leq 1 \quad i = 1, \ldots, 4$$

are satisfied with the largest scalar δ; and
means for determining the transformation as:

$$H_1 = \begin{bmatrix} A \\ p_\infty^T \end{bmatrix},$$

where A is a 3×4 matrix with zeros in the same column as the element in p$_\infty^T$ with largest magnitude and with the other three columns equal to the unit matrix.

32. The system according to claim 27, wherein said means for establishing a constraint for each camera center subset includes:
means for ruling out, for each camera center subset, a number of partitioning configurations for the plane at infinity in relation to the camera projection centers of the camera center subset based on said cheirality, whereby the position of the plane at infinity is effectively constrained as the camera center subsets are traversed in sequential order.

33. A computer-readable medium encoded with a computer program for upgrading a first projective scene reconstruction based on uncalibrated 2-dimensional images into a second quasi-affine projective scene reconstruction, said encoded computer program comprising:
program code for establishing a number of constraints on the position of the plane at infinity by cheirality-based statistical voting; and
program code for determining a transformation for transforming said first projective scene reconstruction into said quasi-affine second projective scene reconstruction based on the established constraints.

34. The computer-readable medium according to claim 33, wherein said program code for establishing a number of constraints is configured for performing said statistical voting by considering the cheirality of a plurality of scene points with respect to camera projection centers.

35. The computer-readable medium program according to claim 33, wherein said program code for establishing a number of constraints includes:
program code for dividing said camera projection centers into unique camera center subsets, each camera center subset comprising at least two camera projection centers; and
program code for establishing, for each camera center subset, a constraint on the position of the plane at infinity based on the cheirality of a plurality of scene points with respect to at least two camera projection centers of the camera center subset.

36. The computer-readable medium according to claim 35, wherein said program code for establishing a constraint for each camera center subset includes:
program code for ruling out, for each camera center subset, a number of partitioning configurations for the plane at infinity in relation to the camera projection centers of the camera center subset based on said cheirality, whereby the position of the plane at infinity is effectively constrained as the camera center subsets are traversed in sequential order.

37. The computer-readable medium according to claim 35, wherein said camera projection centers are divided into pairs, and said program code for establishing a number of constraints is operative for performing said constraint establishment with respect to each pair c(n), c(n+1) of camera projection centers, where n=1 to N−1 and N equals the total number of camera projection centers.

38. The computer-readable medium according to claim 37, wherein said program code for establishing a number of constraints includes:
program code for deriving a number of inequality constraints on the position of the plane at infinity p$_\infty$ as:

$$p_\infty^T c(n) \geq 0 \quad n=1, \ldots, N,$$

where c(n) is calculated based on a corresponding camera matrix P(n) determined as:

$$P(n) = P(n) \cdot \text{sign}\left(\frac{1}{2} + \sum_b \text{sign}[(P(n)X(b))_3 (P(n-1)X(b))_3]\right) \text{ for } n = 2 \text{ to } N,$$

where the summation $$\sum_b$$

performed by the processing unit over a plurality of scene points X(b) seen by the pair of camera projection centers represented by P(n) and P(n−1), the operation (arg)$_3$ selects the third element of its argument, arg, and the function sign(x) is defined as:

$$\text{sign}(x) = \begin{cases} 1 & x > 0 \\ 0 & x = 0 \\ -1 & x < 0 \end{cases}.$$

39. The computer-readable medium according to claim 38, wherein said program code for determining a transformation for transforming said first projective scene reconstruction into said second projective scene reconstruction based on the constraints includes:

program code for solving a linear programming task defined as finding a tentative plane at infinity $p_\infty$ such that the inequalities:

$$\frac{c^T(n)p_\infty}{|c^T(n)|} - \delta \geq 0 \quad n = 1, \ldots, N \quad -1 \leq (p_\infty)_i \leq 1 \quad i = 1, \ldots, 4$$

are satisfied with the largest scalar $\delta$; and
program code for determining the transformation as:

$$H_1 = \begin{bmatrix} A \\ p_\infty^T \end{bmatrix},$$

where A is a 3×4 matrix with zeros in the same column as the element in $p_\infty^T$ with largest magnitude and with the other three columns equal to the unit matrix.

* * * * *

UNITED STATES PATENT AND TRADEMARK OFFICE
CERTIFICATE OF CORRECTION

PATENT NO. : 7,324,686 B2
APPLICATION NO. : 10/380838
DATED : January 29, 2008
INVENTOR(S) : Nister It is certified that error appears in the above-identified patent and that said Letters Patent is hereby corrected as shown below:

In Column 2, Line 44, delete "reconstruczion." and insert -- reconstruction. --, therefor.

In Column 16, Line 3, delete "298-327," and insert -- 298-372, --, therefor.

In Column 17, Line 4, in Claim 6, delete "$p_{28}$" and insert -- $p_{\infty}$ --, therefor.

In Column 22, Line 19, in Claim 27, after "into a" insert -- second --.

In Column 22, Line 54, in Claim 30, delete "$p_{28}$" and insert -- $p_{\infty}$ --, therefor.

In Column 24, Line 7, in Claim 35, after "medium" delete "program".

Signed and Sealed this

Thirtieth Day of September, 2008

JON W. DUDAS
*Director of the United States Patent and Trademark Office*